United States Patent [19]

Harries

[11] 3,757,054

[45] Sept. 4, 1973

[54] AUTOMATIC DIALLER

[76] Inventor: Geoffrey William Harries, 101 Avenue de Paris, 94 Saint-Mande, France

[22] Filed: Oct. 22, 1971

[21] Appl. No.: 191,866

[30] Foreign Application Priority Data

Nov. 6, 1970 France .............................. 7040100

[52] U.S. Cl. ............................................... 179/90 B

[51] Int. Cl. ............................................ H04m 1/23

[58] Field of Search ...................... 179/90 B, 90 CS, 179/90 AD, 90 A, 90 R, 90 AN, 90 AT; 200/46

[56] References Cited

UNITED STATES PATENTS

| | | | |
|---|---|---|---|
| 3,189,692 | 6/1965 | Andregg et al. | 179/90 |
| 3,274,346 | 9/1966 | Silber | 179/90 |
| 2,508,953 | 7/1948 | Knutsen | 179/90 |
| 3,662,118 | 5/1972 | Phoenix et al. | 179/90 |

*Primary Examiner*—Kathleen H. Claffy
*Assistant Examiner*—Kenneth Richardson
*Attorney*—William A. Drucker

[57] ABSTRACT

An automatic telephone dialling apparatus comprises an optical scanning means capable of scanning dialling information in coded form, and a pulse generator connected to said scanning means controlled thereby, said pulse generator having an output connectible with a telephone. This enables the coded information, which may be typed or printed on strips, to be scanned to thereby initiate dialling of the required number on the actuation of a press button.

9 Claims, 7 Drawing Figures

AUTOMATIC DIALLER

BACKGROUND TO THE INVENTION

The present invention relates to an automatic dialling apparatus and generally to communications by telephone or by a similar telecommunications system (e.g. Telex), in which each user is identified by a call code or call number and in which suitable automatic change-over systems enable a caller and the subscriber whose code or number he has dialled to be automatically placed in communication. In particular, the invention relates to an apparatus intended to be associated with a subscriber's installation, to enable a call to be made automatically to a subscriber included in a list prepared in advance.

Numerous types of automatic telephone calling apparatus are already known. These comprise, in conjunction, an electric impulse emitter connected to the communication circuits, a memory of which each address contains the information required for calling a subscriber, and means for the selection of an address and the automatic control of the impulse emitter. In apparatus of this type hitherto known the memory usually consists of a magnetic support on which the necessary items of information are recorded in the form of a coded sequence of domaines polarized in one direction or the other; in such apparatus, not only are the items of information recorded not legible but their erasure and modification call for the use of complex and costly electromagnetic devices. In other apparatus previously known, the memory support consists of cogwheels of which the teeth are selectively broken or struck off and of which the rotation, via a scanner associated therewith, controls a switch incorporated in the impulse emitter; these types of apparatus suffer from the drawback of not only precluding any modification of the information recorded but of necessitating special supplies, while at the same time being very limited in their capacity.

The purpose of the invention is to provide an apparatus which enables a subscriber to be called automatically and which combines the functional advantages of the apparatus of this type previously known but which involves none of the difficulties as regards their use, this object being achieved both as regards the supplies required and as regards the ease with which any information can be recorded, erased or modified and the possibility of obtaining a non-coded reading thereof.

SUMMARY OF INVENTION

According to the present invention there is provided an automatic telephone dialling apparatus comprising an optical scanning means capable of scanning dialling information in coded form and a pulse generator connected to said scanning means and controlled thereby, said pulse generator having an output connectible with a telephone or transmission line. Preferably the apparatus is provided with means for receiving selected dialling information in which case the coded information may be carried on flexible strips which are capable of being stored in pockets formed in plastic sheets which may be bound in the form of an indexed directory. Alternatively, the information may be carried on a sheet which may be flat or rolled.

The sheet or strip of paper, on which the information required for calling each subscriber is recorded both in the form of an address legible "in clear" and accessible to the operator and in that of a coded sequence of symbols and intervals representing the call code or call number of the subscriber, which sequence is capable of being not only read by automatic control means for the aforementioned impulse emitter but also easily decoded by the operator if required.

This coded sequence advantageously takes the form of groups of symbols written on one and the same line, each corresponding to a character or figure of the call code or call number of the subscriber, these symbols preferably consisting of bars transversal to the aforementioned line, particularly of the separate strokes of which typed characters are composed, such as I's or U's.

It is immediately obvious that the apparatus to which the invention relates, owing to the fact that paper or similar material is used as a graphic support for the information, that it only requires supplies of an everyday nature and enables information to be recorded, erased and modified with great ease.

BRIEF DESCRIPTION OF DRAWINGS

Constructional embodiments of the present invention will now be described by way of example, with reference to the accompanying drawings, wherein.

DESCRIPTION OF PREFERRED EMBODIMENT

Figures 1, 2, 3:
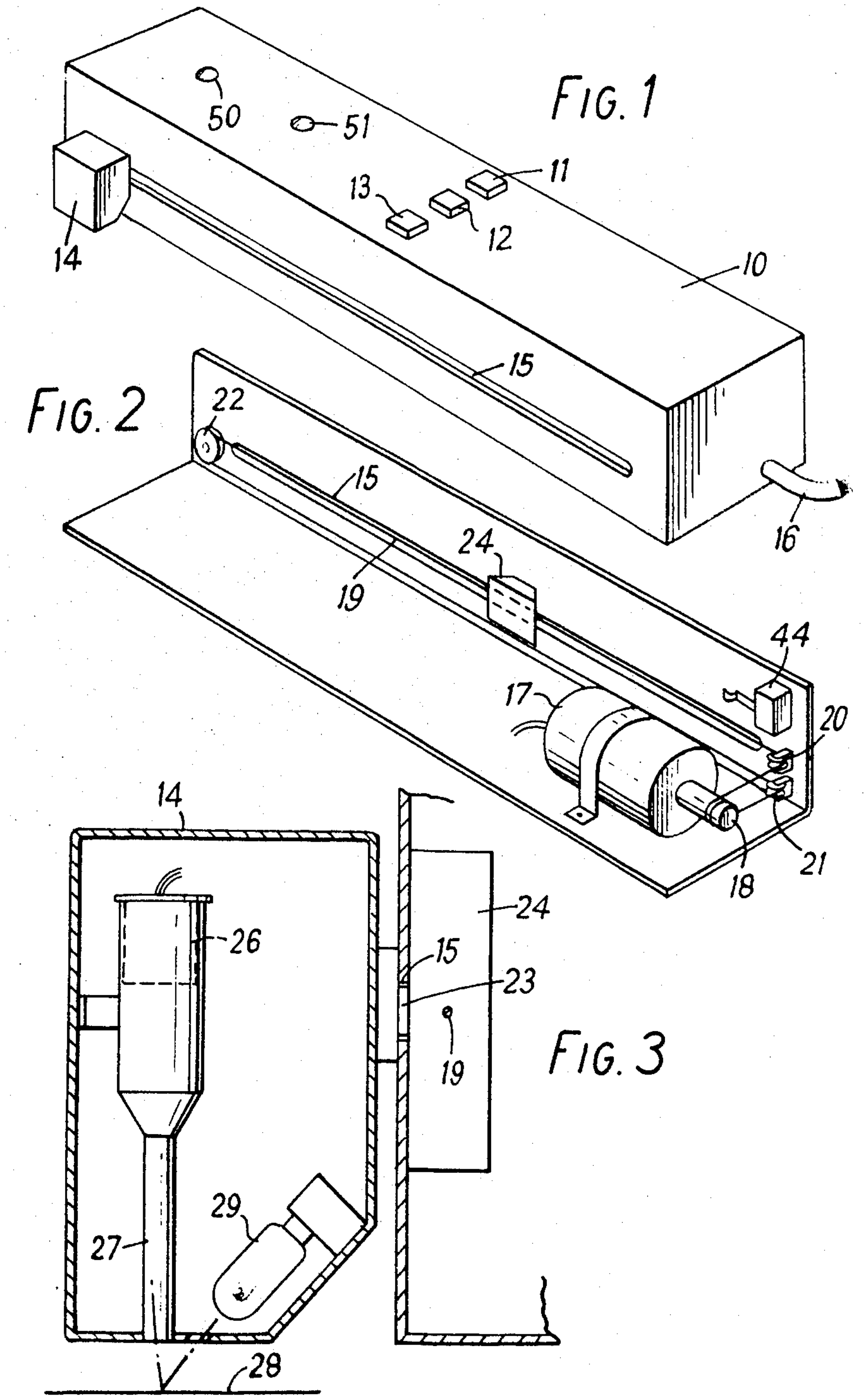
FIG. 1 is a perspective view of the automatic dialler
FIG. 2 is a rear perspective view of the dialler with the top and rear wall removed to show the mechanical arrangement for driving the scanning head, the printed circuit and relays being omitted for clarity.
FIG. 3 is a detail sketch of the optical scanning head of the dialler in FIG. 1.

FIGS. 1 and 2 show the apparatus having a rectangular housing 10 with recessed "dial," "recall" and "return" buttons 11, 12, 13 in the upper surface and an optical scanning head 14 is movable along the slot 15 formed in the side of the housing by driving means arranged within the housing. Electrical leads 16 ae provided to the telephone from one end wall of the housing 10.

The driving means (see FIG. 2) comprise a reversible motor 17 which has a shaft 18 around which passes a Nylon cable 19 running over two pulleys 20, 21 at one end of the housing and a single pulley 22 at the other end. The scanning head is carried by an arm 23 (FIG. 3) which passes through and slides in the slot 15 to a support block 24 serving also as a cam device for microswitch contacts 42, 43 in the circuit described in FIG. 4. The block 24 is secured to the cable 19.

FIG. 3 shows the optical scanning head 14 comprising a photo transistor 26 disposed at the upper end of a collimator 27 situated in a vertical position above the scanned surface 28 illuminated by lamp 29.

Figure 4:
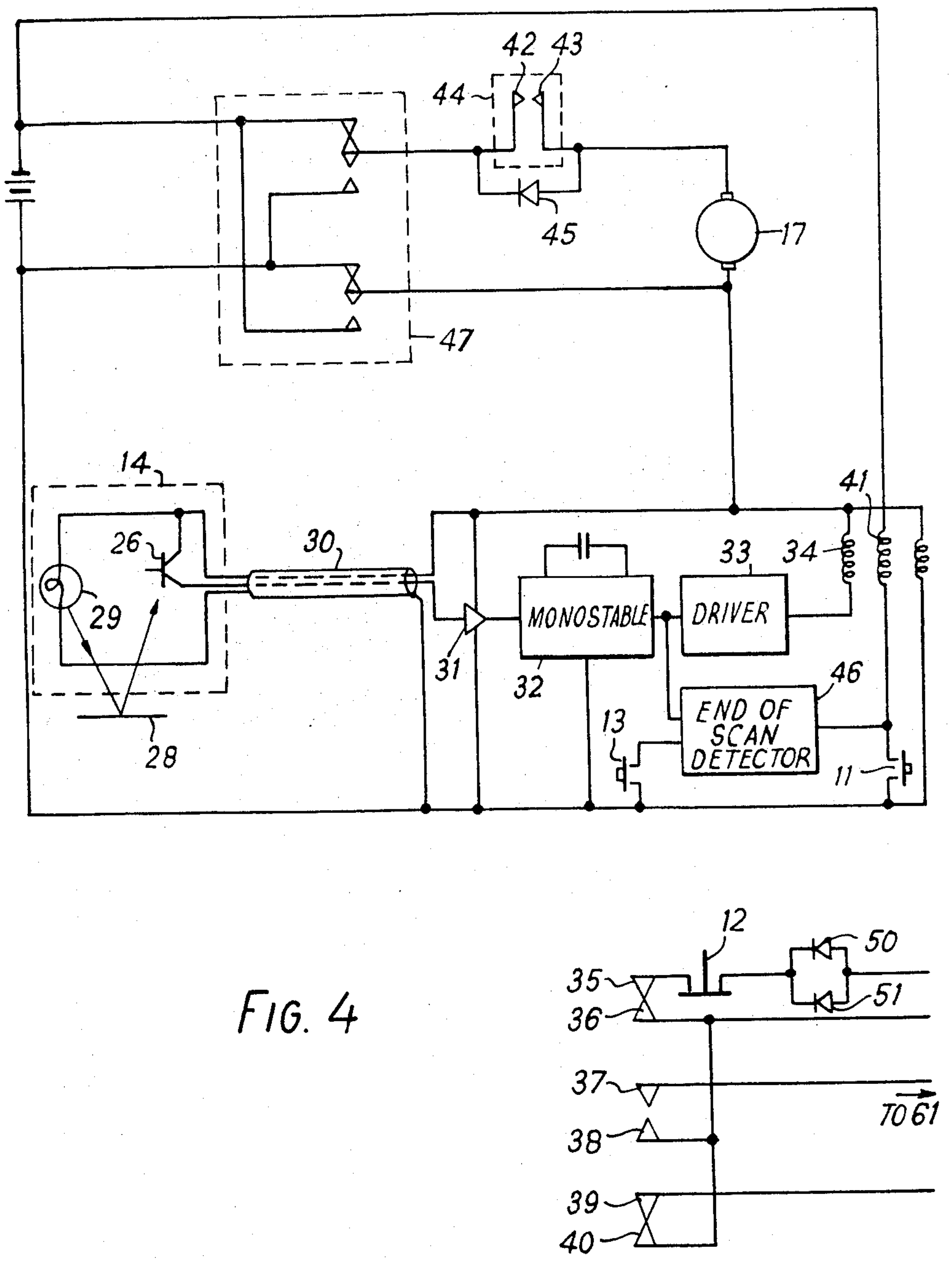
FIG. 4 is a circuit diagram of the dialler.

FIG. 4 is a circuit diagram of the automatic dialler contained within the housing 10. The optical head 14 contains the lamp 29 and the photo transistor 26 connected by a lead 30 to an amplifier 31 which supplies a monostable circuit 32. The monostable circuit controls the driver 33 connected to the relay coil 34. A changeover switch 47 is controlled by a coil 41 in series with the button operated switch. The remaining components of the circuit will be described in the following description of operation in which the dialler is arranged to scan from a strip provided with coded information in the form of vertical bars arranged across the strip. This will be described later.

With the automatic dialler off all relays and switches are in positions as shown in FIG. 4 and no power is consumed. Contacts 35 and 36 (reed relay) are however closed (they are in series with the dial in the telephone) so the telephone can be used in the normal manner. The telephone circuit varies with each country, but in general it includes a contact, normally closed, which opens at the rate of 10 times per second, during the dialler sequence. There are also two other sets of contacts 37, 38, 39, 40; normally open but closed by coil 49 during the dialling of a number for shorting out the earpiece and the bell in the telephone during dialling.

When a number to be dialled by the automatic dialler the latter is placed with its scanning head over the appropriate coded number. The bial button 11 is pressed and relay coil 41 energises and closes the contacts of a changeover switch 47. This causes the polarity of the voltage applied to the motor 11 to reverse. The cam block 24 attached to the scanning head is at the extreme left hand of its scan and has pushed open the contacts 42, 43 of the end-of-course microswitch 44. The motor 17 is energised via diode 45 and starts to turn causing the optical head 14 to scan from left to right (in FIG. 1). After it has moved a short distance it allows the microswitch contacts 42, 43 to close. At this point the dial button 11 can be released and the motor will continue to turn. Relay coil 41 remains energised because pulses from the monostable 32 which are peak detected in the end-of-scan detector circuit 46 pass through the coil 41.

The circuit is arranged so that if there is white under the optical head, the output of the amplifier 31 is down and the relay coil 34 is de-energised. Contacts 35, 36 are therefore closed. As soon as a black bar is encountered, the light entering the phototransistor drops and the output of the amplifier rises. This causes the integrated circuit monostable to give out a pulse of 33 ms duration, i.e. corresponding to the width of the black bar. This is amplified by the driver circuit 33 and energises coil 34, holding open contacts 35, 36 for 33 ms. The optical head scans the vertical bars at a rate sufficient to open the contacts 35, 36 at 10 pulses per second. Since the change of state at the output of the monostable 32 is of short duration (33 ms) when scanning each black bar the end of scan detector maintains coil 41 in an energised state.

When the scanning head passes over an extra black stop member 48 the pulse or change of state at the output of the monostable will be of such duration that the detector will cease to effect energisation of the coil 41. The contacts of the changeover and switch 47 will change over and the optical head will start back towards its point of origin as the polarity applied to the motor has been reversed. As soon as the optical head touches the end-of-course microswitch 44 it forces open contacts 42, 43 and all action ceases. The circuit is then back in its initial condition.

It may be that a call is made in the usual way but after the first characters are scanned the operator realises he has made a mistake and wants to cancel the call. One could of course, merely hang up and wait for the dialler to finish its scan and return to the rest or left hand position. Pressing the return button 13 causes the optical head immediately to start on its return journey.

Normally, however, the optical head will continue scanning the vertical bars until the extra thick stop marker 48 (see FIG. 5) is reached. At this point the relays are de-energised. However the motor 17 continues to turn (in the reverse direction), because contacts 42, 43 are closed, winding the optical head back to the left where the contacts 42, 43 are forced open and the initial condition is established. The contacts 37, 38 and 39, 40 are closed during the forward scan (shorting out the bell and the earpiece) but open at all other times.

The recall button 12 is a switch in series with the normally closed contacts 35, 36 controlled by relay coil 34. If a number is scanned and found to be engaged the normal action would be to hang up and after awaiting the dial tone to try again. Instead of hanging up the recall button can be pressed and the dial tone will return. Another (or the same) number can then be dialled.

The diodes 50 and 51 are electro-luminescent diodes (LED's). When the handset is taken off the hook preparatory to making a call, one of these diodes will light up. When the scan commences, this diode will wink as the bars are scanned. It therefore shows that the device is working. When the correspondent picks up his phone, one diode will go out and the other will light up.

A small loudspeaker may be incorporated in the housing of the dialler which is very useful when waiting for a call to go through or for someone to be called to the phone. It may have its own volume control and on/-off switch.

Figure 5:
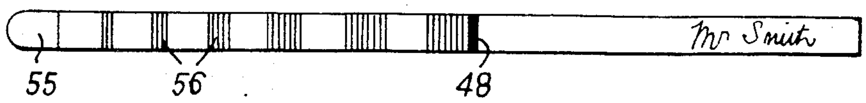
FIG. 5 is a plan view of an elongated flexible coded strip.

FIG. 5 shows a flexible strip 55 carrying on one end the name of a subscriber and at the other, groups of bars 56 transversely disposed to the longitudinal axis of the strip, each bar representing a pulse to be transmitted, coded in such a way that every digit may be represented by a group of bars, the plurality of bars comprising each group being dependant on the digit represented, with the exception of zero which is represented by ten such bars. Each address consists of the surname of the subscriber or of the name of the firm in question or else of an abbreviation, symbol or code sign enabling it to be identified. These addresses are located at a margin of the strip of paper. The coded sequence associated with each address is marked, stuck or typed, for example, on the same line and consists of a number of groups of bars separated by intervals, each one corresponding to a figure of the call number of the subscriber. An end-of-scan marker 48 (described above) is provided immediately after the last digit. Methods of coding will be described later.

The strips may be manufactured from cardboard or other such flexible material. The strip may be 21 centimetres long and 5 centimetres wide, to which the bars of specially made transfers such as decals may be stuck. In the example the bars are stuck 1 millimetre apart, each group being spaced 8 millimetres apart and the total scanning length of the strips is 180 millimetres. The scanner is preferably driven across the strips at 10 millimetres a second, the aperture of the collimator of the scanner being 0.5 millimetres.

In one particularly convenient method of coding, each of the figures of the call number is represented by as many vertical bars, each of the latter being formed by the letter I or by one of the branches of the letter U.

For example, the information required for automatically calling a hypothetical "Societe pour la Promotion dans la Technique," of which the telephone number is 304.56.13, could be written in one of the following forms:

PROMOTEC III IIIIIIIIII IIII IIIII IIIIII I III
PROMOTEC UI UUUUU UU UUI UUU I UI

The second and more condensed method of writing the information enables all the data to be recorded, in all cases, on one and the same line of a sheet or strip of paper of normal width, while rendering the control device for the impulse emitter easier to construct.

The fact is that the purpose of this latter device is to produce pulse trains separated by intervals of 800 milliseconds the impulses succeeding one another at the rate of about ten per second. Under the simplest circumstances, if the coded sequence is explored at a constant speed the length of the graphic interval must be equal to that of the group of characters representing the figure "0" (ten impulses), i.e. 10 or 5 characters, according to whether it is written by means of an "I" or a "U." Assuming the extreme case in which a call number comprises seven noughts (and thus six intervals), the coded sequence written by means of the letter "I" or "U" would thus occupy 130 or 65 characters and spaces respectively. This latter value is slightly lower than the capacity (about 80 characters) of a sheet or strip of paper of the usual size (21cm). In view of the statistical distribution of the figures 0 – 9 in a call number, which in practice reduces the length of the coded sequence, there is thus always sufficient room left on the same line for the entry, in clear, of details identifying the subscriber.

Figure 6:
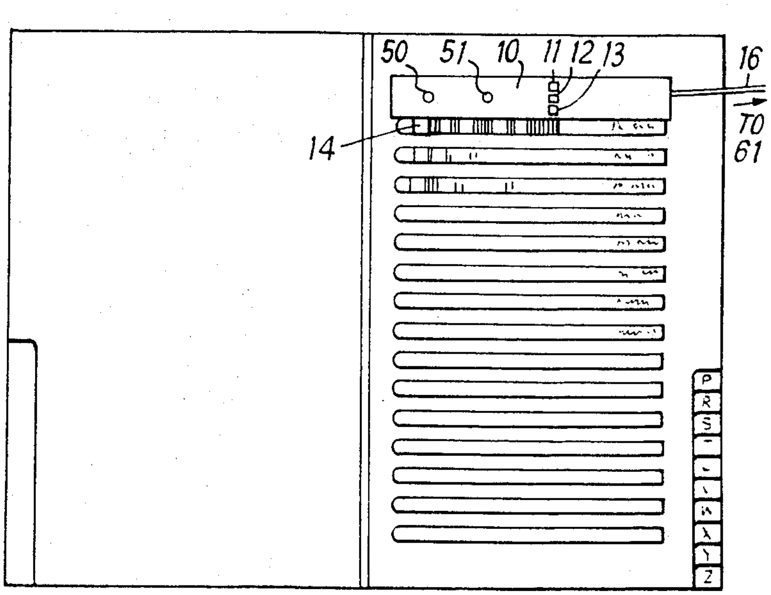
FIG. 6 is a plan view of one page of the alphabetically indexed directory of the memory store with the dialler in use.

FIG. 6 shows one page of the memory directory with a number of the flexible slips filed in slots 7 in a transparent plastic sheet 8. The directory is alphabetically indexed at 9.

Figure 7:
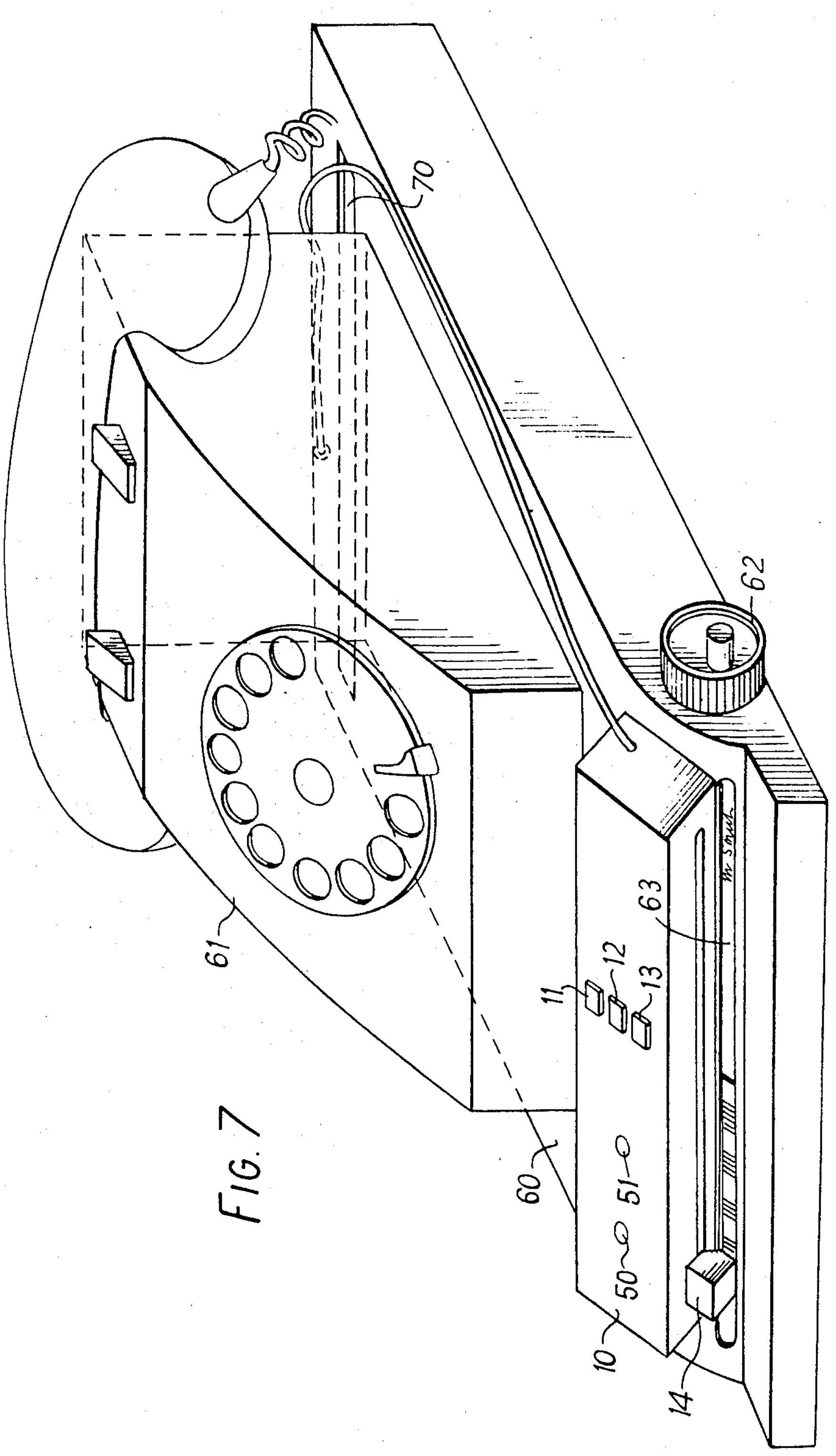
FIG. 7 is a view, in perspective, of an automatic dialler mounted on a base for receiving the telephone.

An alternative use of the dialling apparatus is shown in FIG. 7. The apparatus includes a flat base 60 which can serve as a stand for the telephone 61 with which it is associated. On one of the sides of the base 60 is a driving knob 62 for moving a graphic support mounted inside the base, e.g. a strip of paper wound onto two rollers (not shown) operated together by the driving knob 62.

This strip of paper forms the memory containing the information required for automatically calling any subscriber. These items of information may take the form of a typed line comprising both an address or other details identifying the subscriber and as described above, a coded but easily decodable sequence of symbols and intervals enabling the impulse emitter incorporated in the apparatus to be controlled automatically via a suitable optical scanning and reading device also as described above.

The paper can be moved by the driving knob 62, into a position underneath a window 63, provided on the front of the base 60; this window is closed by a transparent screen bearing a graticule consisting of two parallel horizontal lines (not shown) between which the address of the subscriber to be called is to be presented.

The apparatus could alternatively or additionally be arranged to read other graphic supports than the sheet or strip of paper constituting its main memory; for example, the apparatus may be provided with means for receiving cards, strips or plaques.

The apparatus of FIG. 7 can be used as follows:

After the address of the desired subscriber has been moved into position between the parallel strokes of the graticule of the window 63 by operating the driving knob 62, the operator unhooks the telephone handset and, as soon as the required tone is heard presses the dialling button 11. This causes the call code of the subscriber to be scanned by the optical scanning device 5, this process being followed by the rhythmic operation of the impulse emitter associated therewith. If the called subscriber's telephone is engaged, then either the unit can be replaced and the sequence of operations recommenced or the recall button 12 can be pressed, in which case the button 11 can once again be pressed as soon as the calling tone is heard. The dialler rests on the base in the example but may be attachably removable by clips or magnets.

Furthermore, the apparatus shown in FIG. 7 could be provided with improvements designed to facilitate its use, such as motor devices for mechanically driving the strip of paper or other graphic support, in order to enable an address to be traced more speedily, or devices enabling the graphic support to be rewound and/or rapidly removed and replaced.

The above described method of coding the call number of a subscriber is easily decodable, both for a human operator and for an automatic optical reading device, which may simply consist of a photo-sensitive cell coupled to a generator of electrical impulses and associated with a mechanism such as a mirror or slide enabling the line moved into the reading position to be explored or scanned.

More elaborate methods of coding could be used, e.g. for the transcription of complex alpha-numerical call codes, without departing from the fundamental principle of the invention, i.e. the use of paper or some other graphic support as a memory. The use of a memory of this kind, in fact, offers a number of decisive advantages:

In the first place, the only supplies required are those of an everyday nature.

Furthermore, the erasure or modification of the information is an extremely easy task, as the use of a pencil and rubber suffices. For this purpose the apparatus is advantageously provided, e.g. on its upper surface, with a correction slit 70 enabling the whole of a line entered on the strip of paper enclosed in the base 60 to be exposed for correction.

A further advantage of the memory used is its capacity, since one single sheet of paper of ordinary commercial size can accommodate all the necessary information required for automatically calling about sixty subscribers. Still better, in the case of a strip of paper wound onto two rollers, the length of the graphic support can be increased to about two metres, which enables the information relating to several hundred subscribers to be recorded. The average time of access to this information, by the winding of the strip, remaining within the reasonable limit of a few seconds.

A further advantage of the method used is that it can be easily prepared in a number of copies, by means of simple carbons, and even reproduced at very low cost by means of a duplicator apparatus, in order to be widely distributed, e.g. throughout the various departments of a firm.

For reasons of convenience of use it has been assumed in the examples illustrated that all the items of information relating to one and the same subscriber were entered on one single line and on one and the same surface of a graphic support; under these conditions the automatic scanning device is necessarily positioned to pass over the line in a longitudinal direction. It is obvious, however, that other arrangements could be adopted and that the address and coded sequence concerning one and the same subscriber, for example, could be "offset" by a certain number of lines and/or entered on the opposite surfaces of the graphic support.

I claim:

1. An automatic telephone dialling apparatus comprising:

a. an housing b. optical scanning means capable of scanning dialling information in coded form and arranged to move linearly along said housing over said information, c. means for mechanically driving said scanning means along the length of the housing d. a pulse generator within said housing electrically connected to said scanning means and controlled thereby, e. said pulse generator having an output connectible with a telecommunications system.

2. A dialling apparatus according to claim 1, wherein said scanning means comprises a scanning head containing a light source and photodetector.

3. A dialling apparatus according to claim 3, wherein the scanning head comprises a collimator containing said photodetector which is in the form of a phototransistor, said light source being mounted in close proximity to the lower end of the collimator.

4. A dialling apparatus according to claim 3, wherein said scanning head is arranged to reciprocate within along the exterior of said housing, the latter having a slot through which extends means connecting the scanning head to said driving means.

5. A dialling apparatus according to claim 1 including a base in the form of a flat box which can serve as a stand for a telephone, said base being provided with at least one window through which the coded information and other related information can be read.

6. A dialling apparatus according to claim 5, wherein means are provided for supporting the coded information carrier in the form of a sheet which can be driven by driving means controlled manually or by electric motor.

7. A dialling apparatus according to claim 1, wherein the pulse generator comprises a transistor amplifier electrically connected to the output of said scanning means, a monostable circuit connected to said amplifier, and a reed relay controlled by said monostable circuit, said reed relay serving to provide pulses to the telephone.

8. In combination a dialling apparatus according to claim 1 together with a carrier for coded dialling information, said carrier being in the form of a strip, sheet, which may be flat or rolled or plaque.

9. A combination according to claim 8, wherein the carrier is in the form of a strip and the information is coded by providing groups of bars arranged transversely of the length of the strip, said bars being formed by means of typing, pen or the adhesion of decals.

* * * * *